US009780966B2

(12) United States Patent
Bomgaars et al.

(10) Patent No.: US 9,780,966 B2
(45) Date of Patent: Oct. 3, 2017

(54) NETWORK APPARATUS FOR SECURE REMOTE ACCESS AND CONTROL

(71) Applicants: Joel Bomgaars, Jackson, MS (US); Jeremy Raymond Cross, Kelowna (CA); David William Durham, Raymond, MS (US); Nathan Joel McNeill, Brandon, MS (US); Huey Jiun Ngo, Flowood, MS (US); Ryan D. Sleevi, Hernando, MS (US)

(72) Inventors: Joel Bomgaars, Jackson, MS (US); Jeremy Raymond Cross, Kelowna (CA); David William Durham, Raymond, MS (US); Nathan Joel McNeill, Brandon, MS (US); Huey Jiun Ngo, Flowood, MS (US); Ryan D. Sleevi, Hernando, MS (US)

(73) Assignee: BOMGAR CORPORATION, Ridgeland, MS (US)

( * ) Notice: Subject to any disclaimer, the term of this patent is extended or adjusted under 35 U.S.C. 154(b) by 481 days.

(21) Appl. No.: 13/860,259

(22) Filed: Apr. 10, 2013

(65) Prior Publication Data
US 2014/0310522 A1    Oct. 16, 2014

(51) Int. Cl.
*H04L 29/06* (2006.01)
*H04L 12/64* (2006.01)
*H04L 29/08* (2006.01)

(52) U.S. Cl.
CPC ........ *H04L 12/6418* (2013.01); *H04L 63/083* (2013.01); *H04L 63/0823* (2013.01); *H04L 67/125* (2013.01)

(58) Field of Classification Search
CPC . H04L 12/2856; H04L 67/125; H04L 63/102; H04L 12/6418; H04L 63/0823; H04L 63/083
USPC ........................................................ 713/168
See application file for complete search history.

(56) References Cited

U.S. PATENT DOCUMENTS

| 6,327,579 | B1 | 12/2001 | Crawford |
| 6,353,446 | B1 | 3/2002 | Vaughn et al. |
| 7,346,922 | B2 * | 3/2008 | Miliefsky ........... H04L 63/0272 726/11 |
| 7,376,538 | B1 | 5/2008 | Eatough |
| 7,539,627 | B2 * | 5/2009 | Schmidt ....................... 705/7.16 |
| 7,539,733 | B2 | 5/2009 | Mohammed et al. |
| 7,908,401 | B2 * | 3/2011 | Chang ........................... 709/250 |
| 8,924,459 | B2 * | 12/2014 | Gagne et al. ................. 709/202 |
| 2002/0161895 | A1 | 10/2002 | Appiah et al. |
| 2002/0169783 | A1 * | 11/2002 | Kreulen et al. ............... 707/102 |
| 2003/0008269 | A1 | 1/2003 | Helmick et al. |
| 2003/0093692 | A1 * | 5/2003 | Porras .................... G06F 21/55 726/4 |

(Continued)

OTHER PUBLICATIONS

Citrix Online, LLC., "GoToAssist", 2005, pp. 1-23.
(Continued)

*Primary Examiner* — Kambiz Zand
*Assistant Examiner* — Tongoc Tran
(74) *Attorney, Agent, or Firm* — Ditthavong & Steiner, P.C.

(57) ABSTRACT

A network appliance is designed and configured to communicate over a data network and to provide secure on-demand remote access and control of a computing system in the context of remote support.

32 Claims, 10 Drawing Sheets

(56) References Cited

U.S. PATENT DOCUMENTS

| | | |
|---|---|---|
| 2003/0233432 A1 | 12/2003 | Davis et al. |
| 2004/0001514 A1 | 1/2004 | Wookey et al. |
| 2004/0153712 A1 | 8/2004 | Owhadi et al. |
| 2004/0173059 A1* | 9/2004 | Klein .................... B23B 51/126 81/177.2 |
| 2004/0249975 A1* | 12/2004 | Tuck ................. H04L 29/12066 709/245 |
| 2005/0038827 A1 | 2/2005 | Hooks |
| 2005/0132030 A1* | 6/2005 | Hopen ................ H04L 67/1008 709/223 |
| 2005/0177869 A1* | 8/2005 | Savage ................... G06F 21/41 726/11 |
| 2006/0064582 A1* | 3/2006 | Teal ..................... G06F 21/105 713/156 |
| 2006/0277287 A1* | 12/2006 | McCall et al. ................. 709/223 |
| 2007/0033265 A1 | 2/2007 | Anderson et al. |
| 2007/0044034 A1* | 2/2007 | Nieves ................. G06Q 20/203 715/771 |
| 2007/0143824 A1* | 6/2007 | Shahbazi .......................... 726/1 |
| 2007/0176787 A1 | 8/2007 | Iten et al. |
| 2007/0218875 A1 | 9/2007 | Calhoun et al. |
| 2007/0268837 A1* | 11/2007 | Melton ............... H04L 41/0886 370/252 |
| 2008/0065236 A1 | 3/2008 | Bristol |
| 2009/0077184 A1 | 3/2009 | Brewer et al. |
| 2009/0199276 A1* | 8/2009 | Schneider ........... H04L 63/0815 726/5 |
| 2011/0273294 A1* | 11/2011 | Harwell ................. G06Q 10/08 340/572.1 |
| 2011/0276683 A1* | 11/2011 | Goldschlag ............. H04W 4/00 709/224 |
| 2011/0277027 A1* | 11/2011 | Hayton ............... H04L 63/0884 726/8 |
| 2013/0081112 A1* | 3/2013 | Kelly ................... H04L 9/3271 726/4 |
| 2013/0114610 A1* | 5/2013 | Polcyn ................... H04L 49/70 370/400 |
| 2014/0188676 A1* | 7/2014 | Marmolejo-Meillon ........................... H04L 41/0809 705/34 |

OTHER PUBLICATIONS

Citrix Online, LLC., "GoToMeeting". 2005, pp. 1-4.

Final Office Action for corresponding U.S. Appl. No. 11/748,871 dated Jul. 20, 2011, pp. 1-19.

Final Office Action for corresponding U.S. Appl. No. 11/764,691 dated Dec. 11, 2009, pp. 1-35.

Office Action for corresponding U.S. Appl. No. 11/748,871 dated Nov. 1, 2010, pp. 1-12.

Office Action for corresponding U.S. Appl. No. 11/764,691 dated Jun. 11, 2009, pp. 1-24.

Office Action for related U.S. Appl. No. 11/764,691 dated Sep. 21, 2012, pp. 1-38.

* cited by examiner

NETWORK APPARATUS FOR SECURE REMOTE ACCESS AND CONTROL

RELATED APPLICATIONS

This application is a Continuation of U.S. application Ser. No. 11/748,871, filed May 15, 2007, which claims the benefit of the earlier filing date under 35 U.S.C. §119(e) of U.S. Provisional Application Ser. No. 60/814,867 filed Jun. 19, 2006, entitled "Network Apparatus for Secure Remote Access and Control," the entireties of which are incorporated herein by reference.

BACKGROUND OF THE INVENTION

Information Technology (IT) companies (or departments) that manage their customers' (or organizations') computer systems are constantly challenged with the need to provide timely, secure, and cost-effective support. Remote support provides the means for IT professionals to remotely access and control customers' (or organizations') computer systems. This eliminates the need for these professionals to physically travel on-site to address a problem, thereby minimizing delay in response time.

Traditional remote support approaches possess a number of drawbacks. For example, an Application Service Provider (ASP) hosted approach (also known as Software as a Service, SaaS) requires customers to route all centrally stored or logged data communication through a $3^{rd}$ party data center, thereby potentially introducing security risks. Also, a server software installation deployment model poses complicated, costly integration issues, particularly when implemented into a large IT infrastructure (e.g., corporate network).

Based on the foregoing, there is a clear need for a mechanism that can support secure remote access and control and enable ease of deployment, while minimizing security risks and cost.

DESCRIPTION OF THE PREFERRED EMBODIMENTS

A method and apparatus for providing secure remote access and control are described. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although the various embodiments of the invention are described with respect to a wired network and remote support services, it is contemplated that these embodiments have applicability to other networks including wireless systems, as well as other communication services.

Figure 1:
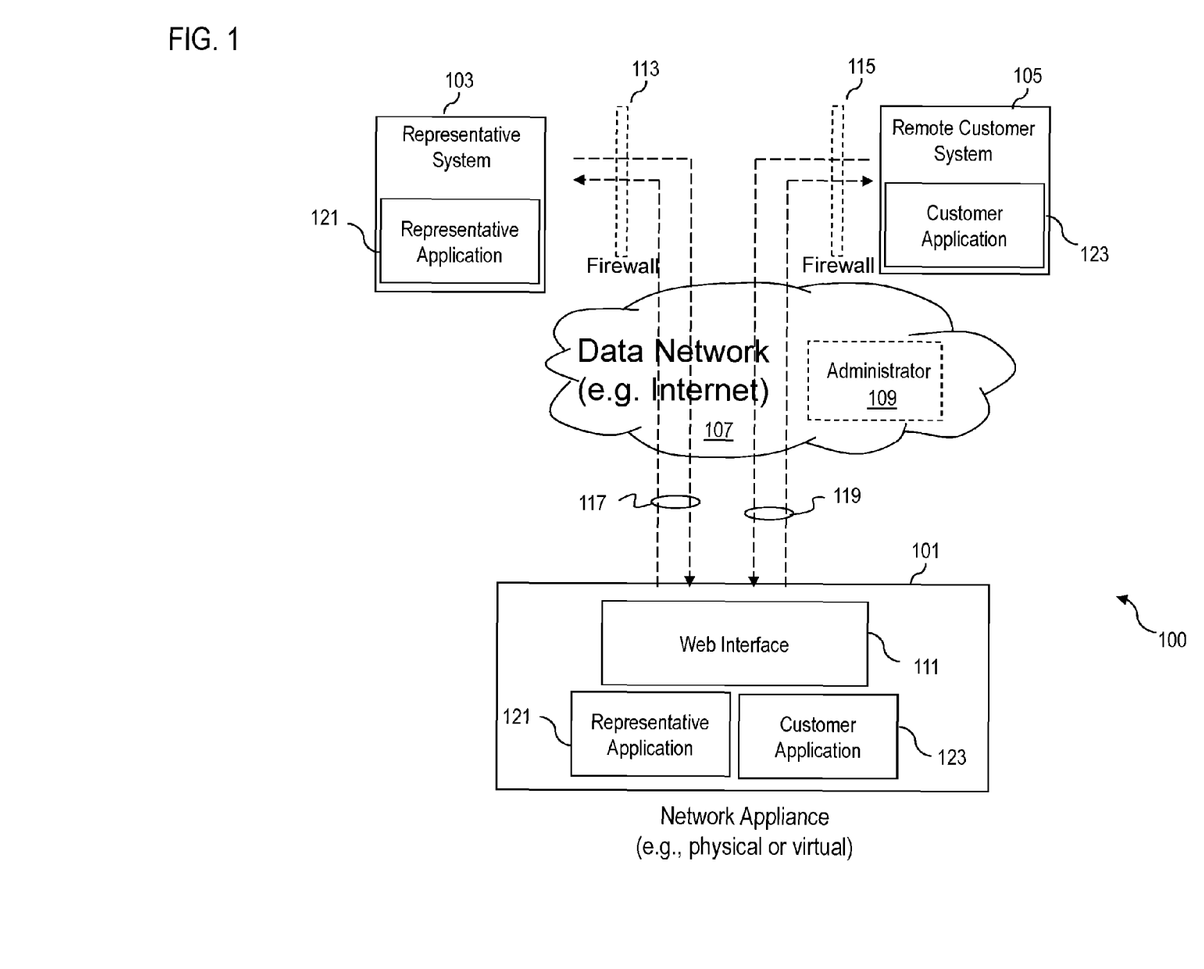
FIG. 1 is a diagram of a communication system capable of providing remote access and control, according to various embodiments of the invention.

FIG. 1 is a diagram of a communication system capable of providing remote access and control, according to various embodiments of the invention. For the purposes of illustration, the communication system 100 is described with respect to a remote support service, as facilitated by a network appliance 101, between a representative system 103 and a customer system 105. The network appliance 101, among other functions, is configured to provide remote access and control by the representative system 103 of the customer system 105, thereby enabling, for example, direct control and management of remote PC (personal computer) or remote server support. Thus, the appliance 101 is also referred to herein as a remote access and control appliance. According to one embodiment, the appliance 101 can be implemented as a standalone hardware device; alternatively, the appliance 101 can be virtualized—i.e., virtual appliance. Moreover, the appliance 101 during the same communication session may permit the customer system 105 access and/or control the representative system 103.

In this example, the representative system 103 provides, in certain embodiments, a remote support mechanism that is secure and implemented in a turnkey fashion to one or more remote customers systems 105 over a data network 107 using the network appliance 101. By way of example, the data network 107 can be an internetwork, such as the global Internet, or a private network. The traffic between the representative system 103 and any customer system 105 is handled and managed at the network appliance 101. In an exemplary embodiment, the network appliance 101 is managed by an administrator 109, who can access the network appliance 101 using a graphical user interface (GUI), such as a web interface 111. The network appliance 101, thus, has the capability of allowing on demand product use from anywhere in the world. For example, as long as the network appliance 101 is deployed accessible via a known network address (e.g., public Internet Protocol (IP) address), a support representative can log in to his/her account via the web interface 111 hosted on the network appliance 101 to enable support service functions.

The network appliance 101, according to an exemplary embodiment, is a rack-mountable device (e.g., 1U) that can be installed and deployed at the representative's organization or site; in this manner, data security is in full control of the representative's organization.

The remote access and control appliance 101 also enables the administrator 109 to change settings (configuration parameters) on the appliance 101 itself, in addition to the software it contains. The appliance 101 also provides management functions including the management of one or more representatives via the web interface 111. After physical installation of the appliance 101, the administrator 109 may log on to the appliance via the web interface 111 by using the appliance's public Uniform Resource Locator (URL) address.

In an exemplary embodiment, the representative system 103 can communicate with the customer system 105 using the network appliance 101 via the web interface 111 through one or more firewalls 113 and 115 over secure links 117 and 119. These firewalls 113 and 115 may be implemented at the representative's site, the remote customer's site, or at both sites. Alternatively, no firewall exists at either site. FIG. 1 illustrates the firewall 113 at the representative's site and the firewall 115 at the remote customer's site. According to one embodiment, the representative system 103 and the customer system 105 connect outbound to the appliance 101, thereby eliminating firewall incompatibilities. As such, the appliance 101 can operate through firewalls 113 and 115 as well as proxy servers (not shown).

The representative system 103 may provide remote support to the customer system 105 by downloading a representative application 121 from the network appliance 101 and establishing a session using the downloaded application. In an exemplary embodiment, the downloading (e.g., file transfer) can be executed via the web interface 111. Additionally, a customer system 105 may download a customer application 123 from the web interface 111 of the network appliance 101 to receive the necessary support service from the representative system 103. Such service can be provided by the download program, which provides for the establishment of a support session. These processes are more fully described below with respect to FIGS. 3 and 4. Once the support representative has provided the necessary support to the remote customer, the remote customer application 123 can automatically be erased from the customer system 105. As a result, the application is no longer present at the customer system 105, thereby providing for increased security.

Each support session is initiated by the remote customer system 105 when a support issue occurs and is then discontinued automatically when the session is complete, allowing only a small, irregular period of time wherein the support traffic is crossing the Internet. This secure architecture provides the initial level of security, obscuring the entire support process by leaving existing security structures in place and spontaneously generating each support session.

Under the above arrangement, data from a remote support sessions can remain secure at a facility chosen by the support representative's organization freeing the representative organization from the compliance liabilities involved in, for instance, using application service providers (ASPs) for remote computer support. In one embodiment, as a software/hardware approach, the network appliance 101 eliminates the risk of incompatibilities with other applications that may be running in a shared server environment.

The network appliance 101 also permits support representatives to predict and lower the total cost of ownership (TCO) vis-à-vis the ASP model, in which the support representatives are typically charged a monthly fee. With the network appliance 101, representatives can predict their budget without monthly fees, surcharges, or overages.

Figure 2A:
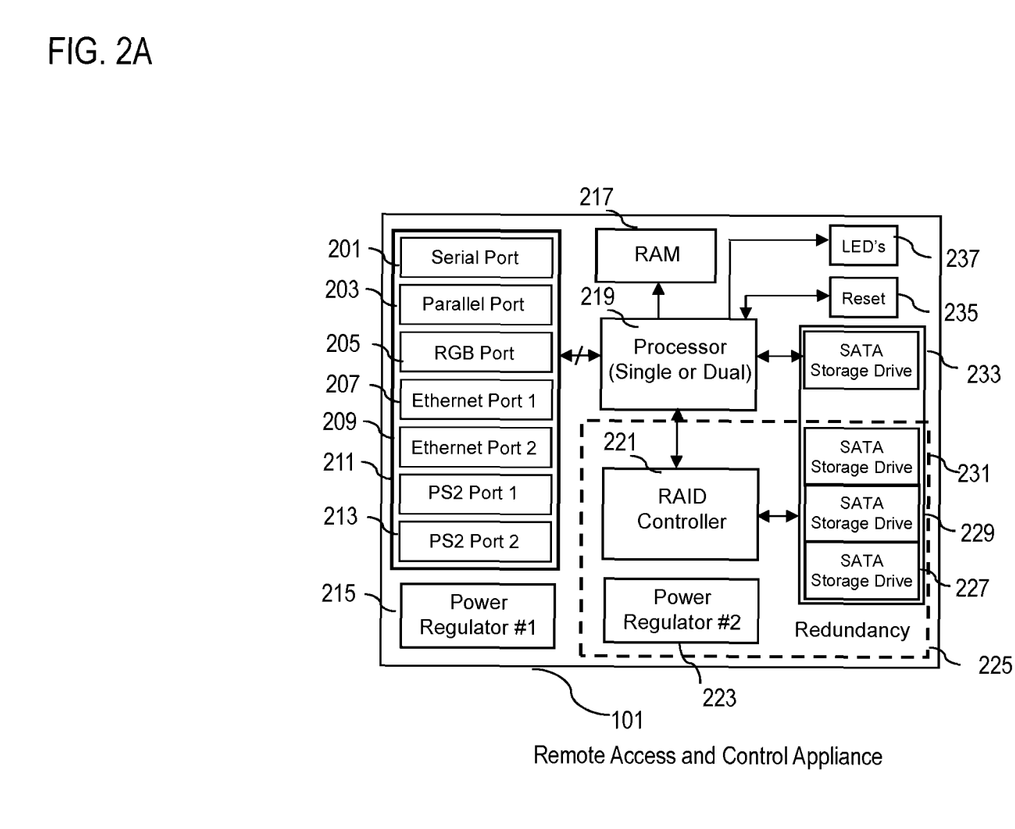
FIGS. 2A-2C are diagrams showing exemplary components of a network appliance, a representative application, and a customer application, respectively, according to various embodiments of the invention.
Figure 2B:
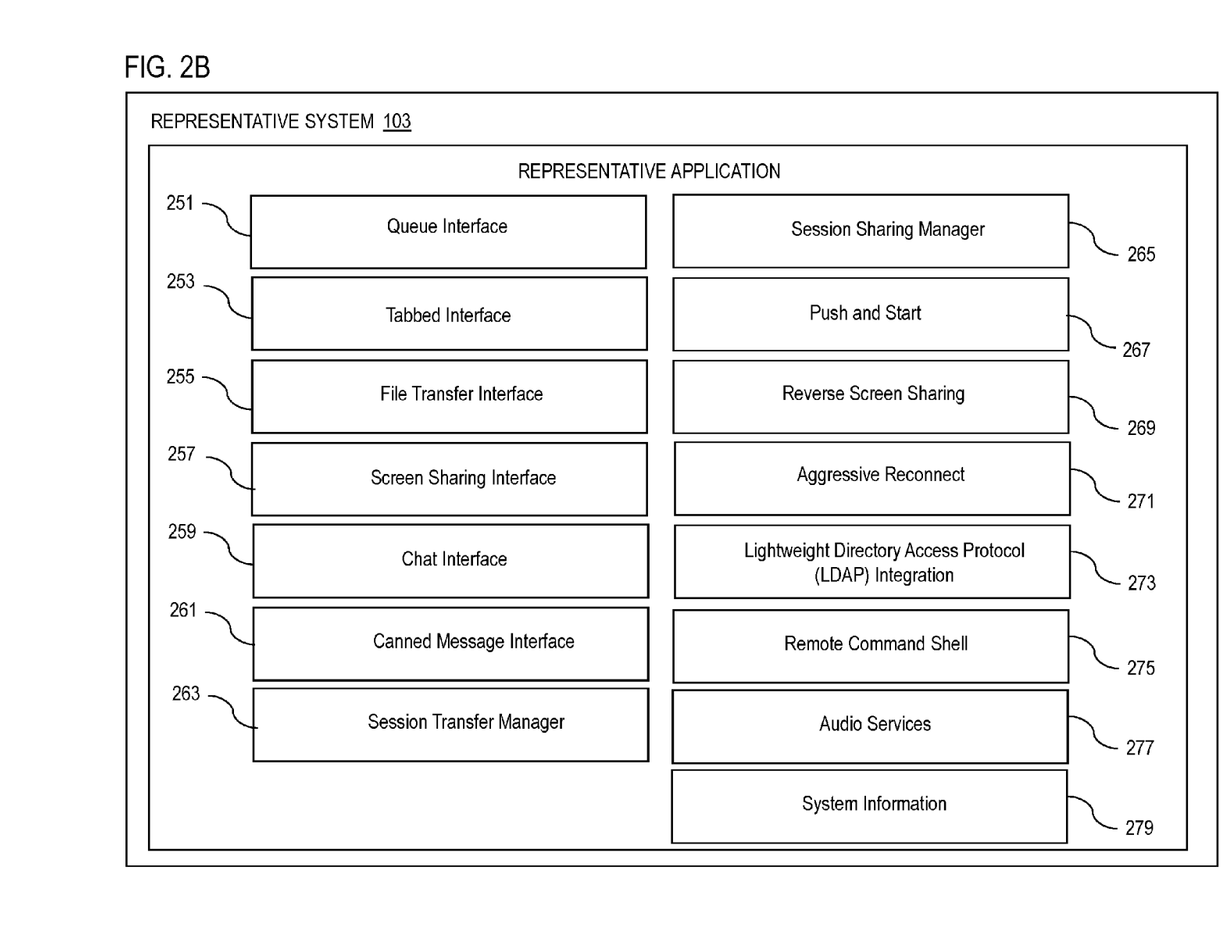
Figure 2C:
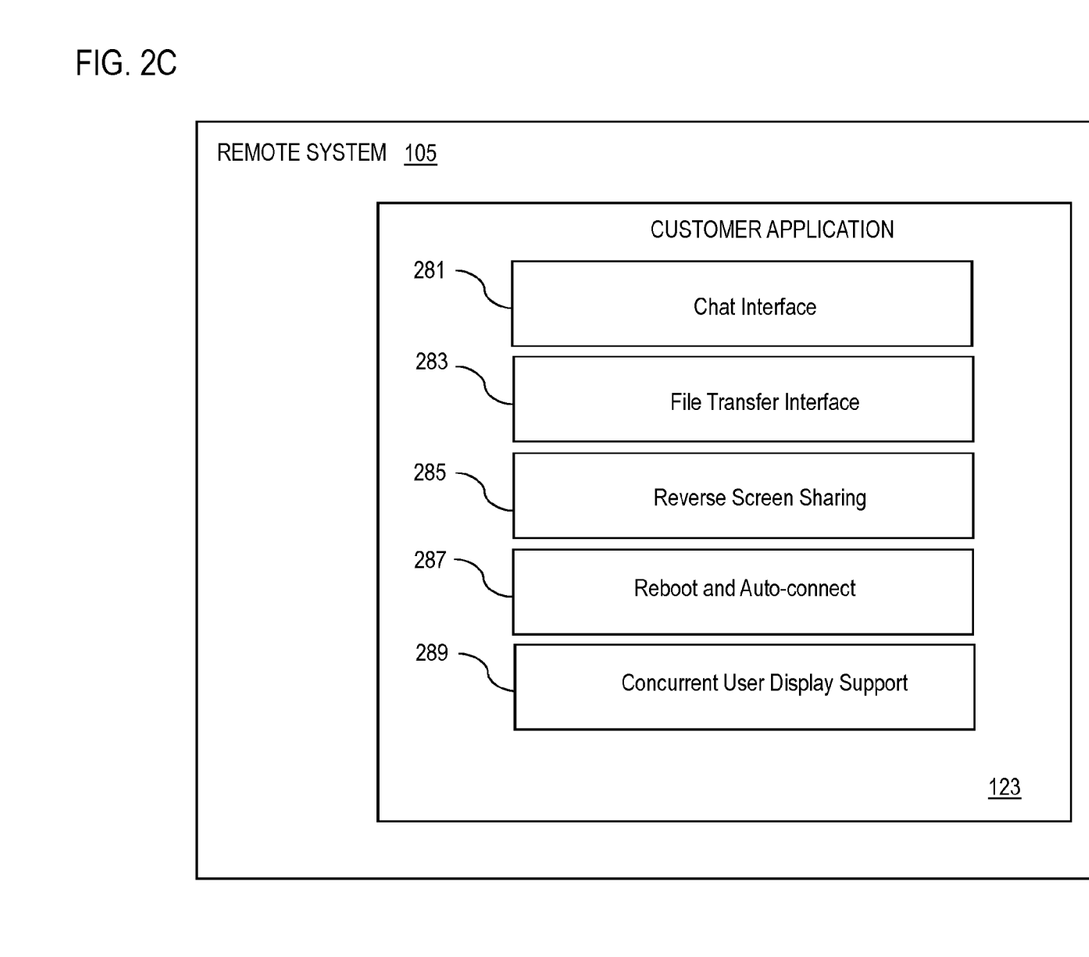

FIGS. 2A-2C are diagrams showing exemplary components of a network appliance, a representative application, and a customer application, respectively, according to various embodiments of the invention. As seen in FIG. 2A, the network appliance 101, in one embodiment, comprises various component interfaces, including serial and parallel ports 201 and 203, a display interface (e.g., an RGB (Red, Green and Blue) port 205), local area network (LAN) ports (e.g., Ethernet ports) 207 and 209, and input device ports (e.g., PS2) 211 and 213. The network appliance 101 also contains a power regulator 215, internal memory in the form of RAM (Random Access Memory) 217, one or more processors 219, each which may be a multi-core processor, LEDs (Light Emitting Diodes) 237, reset control 235 and a SATA (Serial Advanced Technology Attachment) storage drive 233.

As mentioned, the network appliance 101, in an exemplary embodiment, can be a 1U rack-mountable server hardware. However, it is contemplated that configurations other than those illustrated in FIG. 2A can be constructed, depending on the particular applications. For example, different types of appliances can be designed for different uptime requirements. With uptime-critical customers, the network appliance 101 provides for fail-over redundancies; e.g., use of multiple disk drives 227-231, for Fail-over and Hot-Swap capabilities via a RAID (Redundant Array of Independent Disks) controller 221. This configuration of the appliance 101 can also be equipped with a backup AC-DC (Alternating Current-Direct Current) regulator 223, which can be triggered when the main regulator 215 is detected as non-functional. Alternatively, for non-uptime-critical customers, the network appliance 101 can be configured without the additional hardware and/or software required for providing redundancies.

The network appliance 101 is configured to communicate with the representative system 103 and the customer system 105, and can be collocated within either of these systems 103 and 105. The network appliance 101, in various embodiments, executes software applications that can receive, handle, manage, and dispatch system or data messages to and from the representative and customer applications within the respective systems 103 and 105 via secure links 117 and 119. In one embodiment, the security on these links is achieved using the 256-bit Advance Encryption Standard (AES) Secure Sockets Layer (SSL).

As earlier described, the network appliance 101, in an exemplary embodiment, can be a virtual appliance. Such software appliance can be run in a virtual environment. For instance, an image of the operating system and base software application can be installed on a virtual machine. Virtualization provides an abstraction layer that separates the operating system from the hardware, as to permit resource sharing. In this matter, different virtual machines (using heterogeneous operating systems) can co-exist on the same hardware platform.

By way of example, the representative application 121, as seen in FIG. 2B, can provide a variety of components and functions to communicate with the network appliance 101; these components and functions are described in Table 1, as follows.

TABLE 1

| INTERFACE | DESCRIPTION |
|---|---|
| Queue Interface 251 | This interface enables multiple remote system sessions to be maintained in a prioritized queue, thereby allowing for better management of sessions between the representative and customer (that need to be handled in a timely manner). |
| Tabbed Interface 253 | This allows multiple remote system sessions to be active at the same time. |
| File Transfer Interface | This interface shows the |

TABLE 1-continued

| INTERFACE | DESCRIPTION |
|---|---|
| 255 | representative's and remote customer's file system on the same Interface, thereby permitting easy and effective transferring of files from the representative to the customer and from the customer to the representative. |
| Screen Sharing Interface 257 | This allows the representative to view the remote customer's system's screen and control the remote system. |
| Chat Interface 259 | This enables the user to have a full chat interface for ease of communication. |
| Canned Message Interface 261 | This interface permits the representative to send pre-built messages to improve consistency of responses to common questions. |
| Session Transfer Manager 263 | This interface enables the representative to transfer a remote system session to another user of another representative application. |
| Session Sharing Manager 265 | This process enables the representative to share a remote system session with another user of another representative application. |
| Push and Start 267 | This function enables the representative to "push" a remote application executable to a remote system within the same network domain, run the executable, and automatically connect back to start an active session with the user who initiated the push. |
| Reverse Screen Sharing 269 | This allows the representative to show the local system's screen to the remote system user. This feature has to be initiated from the representative application. |
| Aggressive Reconnect 271 | This enables sessions that are disconnected due to unforeseen network difficulties to re-connect within a defined timeout period. |
| Lightweight Directory Access Protocol (LDAP) integration 273 | This component provides integration between the user authentication of the appliance and a user group's LDAP server. |
| Remote Command Shell 275 | Allows the representative to access the remote system's command line interface from the representative's interface locally. |
| Audio Services 277 | This allows for means of audio communication. |
| System Information 279 | This allows the representative to request and receive the remote system's information. |

On the customer side, the customer application 123 is installed temporarily (in one embodiment), as shown in FIG. 2C. The customer application 123, in an exemplary embodiment, can be a native application, so as to achieve a reduced executable size for quick download by the remote customer from the network appliance 101. Architecturally, this application can be identical to the representative application 121. One difference with this application is the use of an uninstaller component, with which the application is capable of uninstalling itself when, for example, a session is completed with proper termination, a session is ended by the user of this customer application, or a session connection timed out.

Table 2, below, lists the exemplary capabilities of the customer application 123:

TABLE 2

| INTERFACE | DESCRIPTION |
|---|---|
| Chat Interface 281 | This interface enables the user to have a full chat interface for ease of communication. |
| File Transfer Interface 283 | This enables the remote customer to receive files transferred or offered from the representative application user via the chat interface. This also enables the customer to transfer or offer files from the remote customer system 105 to the representative system 103. Control and access to the file system of the remote customer is restricted to the permissions granted by the remote customer. |
| Reverse Screen Sharing 285 | This process permits the remote customer to view the screen of the representative. This is generally used as a tutorial tool. |
| Reboot and Auto-reconnect 287 | This component permits the representative to reboot the remote customer system 105 and on system startup, the remote customer application auto-runs and auto reconnects back to the representative application via the appliance. User intervention is not needed. |
| Concurrent User Display Support 289 | This provides the capability of receiving screen updates and messaging from any active user's interactive display on a single system/machine |

With the above arrangement, the representative application 121 via the network appliance 101 can securely communicate with the customer application 123 to access and control the customer system 105.

Figure 3:
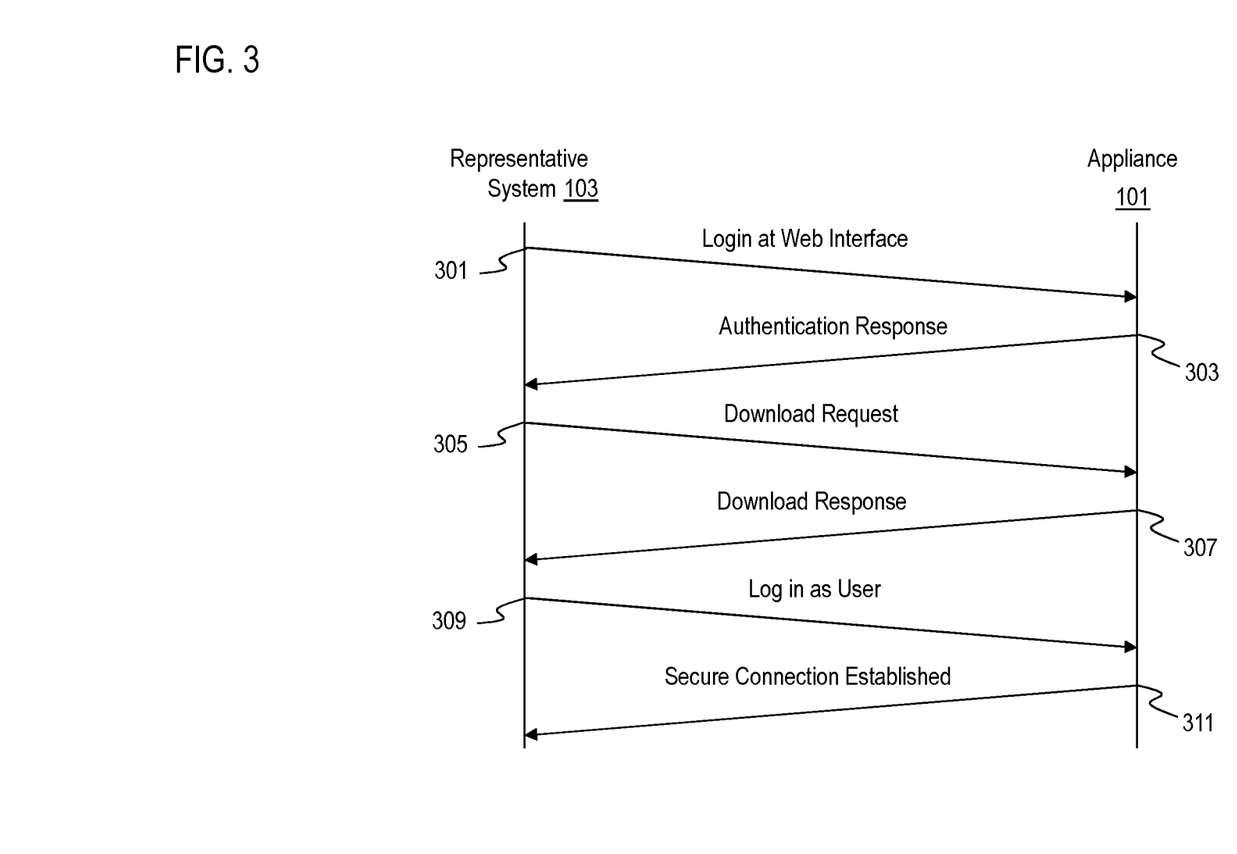
FIG. 3 is a ladder diagram of a process for establishing secure communication between a network appliance and a representative system, according to an exemplary embodiment.

FIG. 3 is a ladder diagram of a process for establishing secure communication between the network appliance 101 and the representative system 103, according to an exemplary embodiment. In step 301, a representative user utilizing the representative system 103 can visit the web interface 111 of the network appliance 101 by entering a public URL and supply login information. In one embodiment, the login information has been set up by an administrator of the network appliance 101. Once the representative system 103 is authenticated through acknowledgement of an authentication response, the system 103 can issue a download request for an application program (e.g., representative software), per steps 303 and 305. In response, the network appliance 101 supplies the representative application 121 to the system 103, per step 307. Accordingly, the representative application 121 can be installed and executed by the representative system 103.

Once the representative system 103 executes the representative application 121, the user can now log in to the network appliance 101 (step 309). Thereafter, in step 311, a secure connection is established between the representative application 121 and the network appliance 101.

The above process establishes the segment of the secure communication from the representative application 121 to the network appliance 101. Next, a secure communication needs to be established between the network appliance 101 and the customer application 123.

Figure 4:
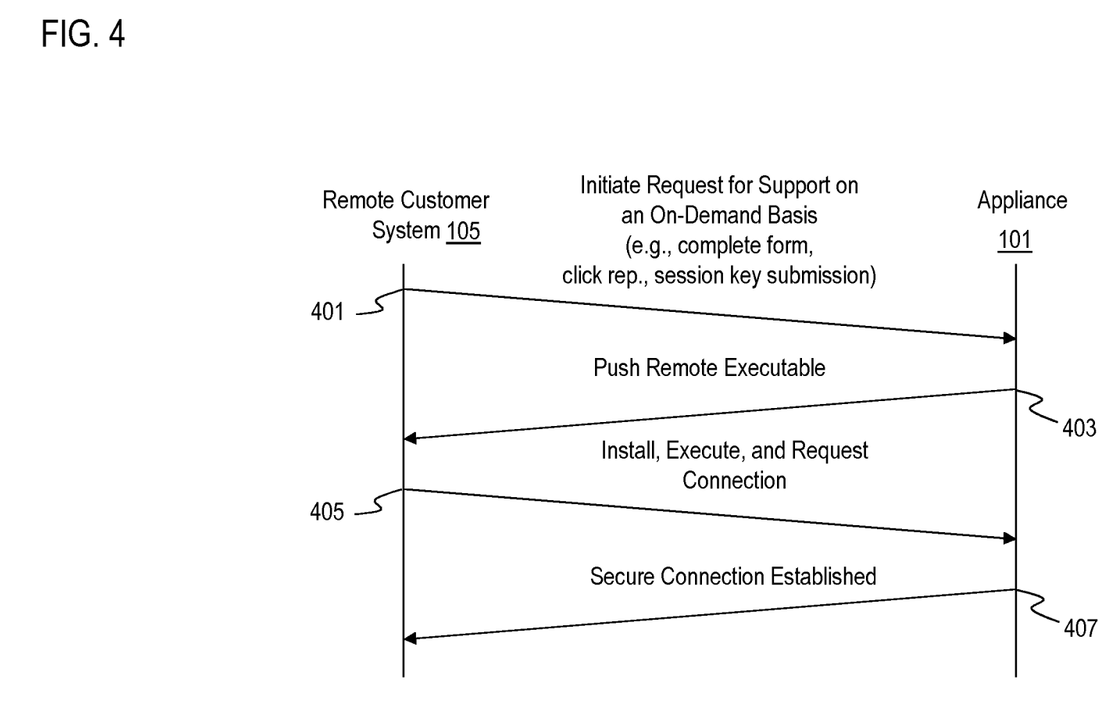
FIG. 4 is a ladder diagram of a process for establishing secure communication between a network appliance and a customer system, according to an exemplary embodiment.

FIG. 4 is a ladder diagram of a process for establishing secure communication between the network appliance 101 and the remote customer system 105, according to an exemplary embodiment. As described, the customer can initiate the support session. For this to occur, the customer system 105 can access the website of the network appliance 101 through the web interface 111. Via this interface 102, the remote customer system 105 submits, as in step 401, a session initiation request, per step 401, to the network appliance 101. The session initiation request by the customer may be realized using various methods: (1) by either completing and submitting a form, (2) by directly selecting a representative from a list of representatives, or (3) by contacting the representative and the representative issuing the customer a session key (e.g., a one-time, randomly generated key).

Regardless of the method by which the customer chooses to initiate a session, the appliance 101 then supplies (e.g., pushes) the remote customer system 105 with a customer application's installer package 106 (in step 403). After downloading the installer package 106, the remote customer system 105 runs the program. This package can be, for example, a self-executable file of the customer application 123. The network appliance 101 then establishes a secure connection with the remote customer system 105 in response to a request by the remote customer system 105, as in steps 405 and 407. Once the connection is established, the representative and the customer can interact securely over the network appliance for support.

Figure 5:
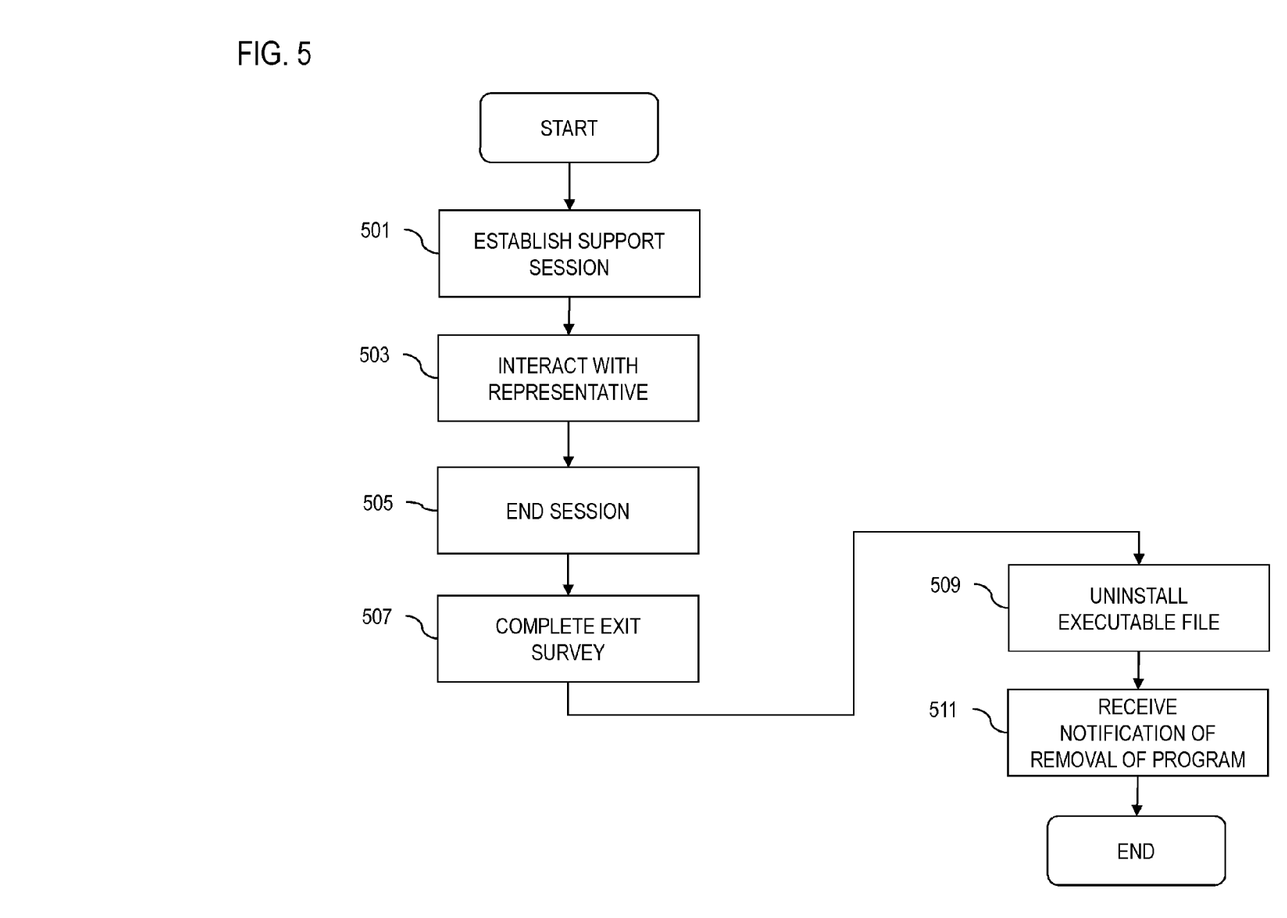
FIG. 5 is a flowchart of a process performed by a customer system for obtaining support services in the system of FIG. 1.

FIG. 5 is a flowchart of a process performed by the remote customer system 105 for obtaining support services in the system 100 of FIG. 1. In this example, the customer may fill out a support form via the web interface 111 and wait for a representative to contact him/her. Once the customer has completed and submitted the form, the customer is placed in a queue that is viewed by the representative. The queue lists all the remote customers who are requesting remote support. The representative may then select one or more customers from the queue to initiate and establish a support session. As an alternative, the customer may instead directly contact the representative by clicking on one of the representatives from the list of current representatives that the customer views from the web interface 111. The representative may then respond to the customer and establish a support session. As another alternative, the customer may directly contact the representative with a support request such as by calling the representative. Upon receiving this request, the representative may generate a session key; a one-time, randomly generated key. The representative may then either direct the customer to a unique Session Key URL or ask him/her to submit the session key via the customer application interface (e.g., Web Interface 111). This will automatically add the customer to the queue and establish a session between the customer and representative. Several remote customers can stay in a queue to connect to a single representative.

In step 501, a support session is established with the remote customer system 105 through an encrypted connection to the network appliance 101 and ultimately with the representative system 103. Namely, the customer application 123 (which was previously downloaded) allows the remote customer to connect to the representative system 103. Upon establishment of the support session, the remote customer application 123 then interacts with the representative application 121, as in step 503, to receive the necessary support. By way of example, the interaction can involve a variety of communications, such as instant messaging through the exchange of chat messages between the representative and the customer; also, this exchange can include the transfer of files, etc.

As one of the capabilities of the customer application 123, the customer has the ability to view the screen of the representative system 103; this capability is useful for conducting tutorials for the customer. In an exemplary embodiment, the customer application 123 has the capability to access and/or control the representative system 103; this capability can be invoked during the same support session. The representative system 103 may also reboot the customer application's system. Upon startup, the customer application 123 is automatically run, and the customer application 123 is automatically reconnected to the representative application 121 via the network appliance 101. Furthermore, the representative may receive screen updates via concurrent user display support when the remote customer uses fast user switching or equivalent user switches on other platforms.

Once the remote customer has received the necessary support from the representative, the remote customer ends the session with the representative, per step 505. The customer may then be prompted to receive an exit survey, as in step 507, regarding the quality of the support experience. At this point, the customer is also provided with an opportunity to supply comments regarding the experience. This survey can then be made available for later viewing by the administrator. The customer application 123 that the customer installed to initiate a session with the representative is uninstalled from the remote customer's computer, as in step 509. The remote customer then receives notification, in step 511, indicating that the remote customer application 123, was uninstalled from the customer system 105.

Figure 6:
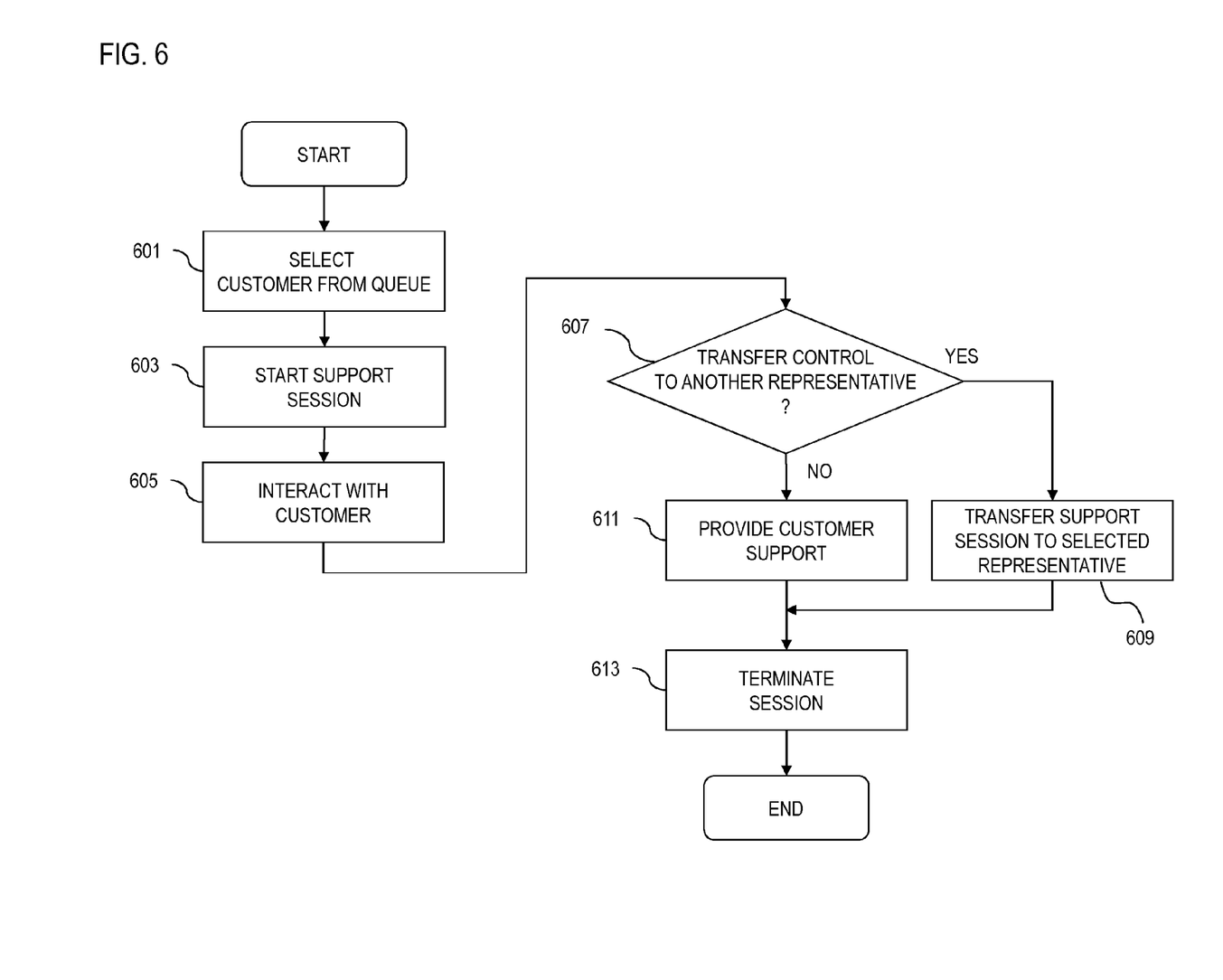
FIG. 6 is a flowchart of a process performed by a representative system to provide support services in the system of FIG. 1.

FIG. 6 is a flowchart of a process performed by the representative system 103 to provide support services in the system 100 of FIG. 1. After a secure connection is established between the representative system 103 and the network appliance 101, the representative may then communicate with the remote customer system 105. The representative may choose from one or more remote customers from a private or public/team queue, per step 601. When a remote customer first initiates a support session using one of the techniques described previously, the customer is effectively placed in a specific queue depending on the information that is submitted. The public/team queue lists all customers who are waiting for a support session with any logged-in representative. The private queue lists all customers who have been either listed specifically after the representative has pulled them from the public/team queue or if they have entered a session key or selected the display name of the representative. Having selected the remote customer, the representative then starts a support session in step 603 and interacts with the customer in step 605. This interaction can be one or a combination of communication methods—e.g., telephony, electronic mail, instant messaging, file transfer, etc.

If the current representative determines that another representative is better qualified to handle the support, then the representative may decide (in step 607) to transfer the support session to another representative (step 609). In step 611, if the representative does not transfer the support session, the representative then provides the requested support. According to one embodiment, the representative may choose to view the session between the customer and the other representative. Once the customer receives the necessary support, the session ends, per step 613. In one embodiment, ending the session uninstalls the customer application 123 from the remote customer system 105.

Figure 7:
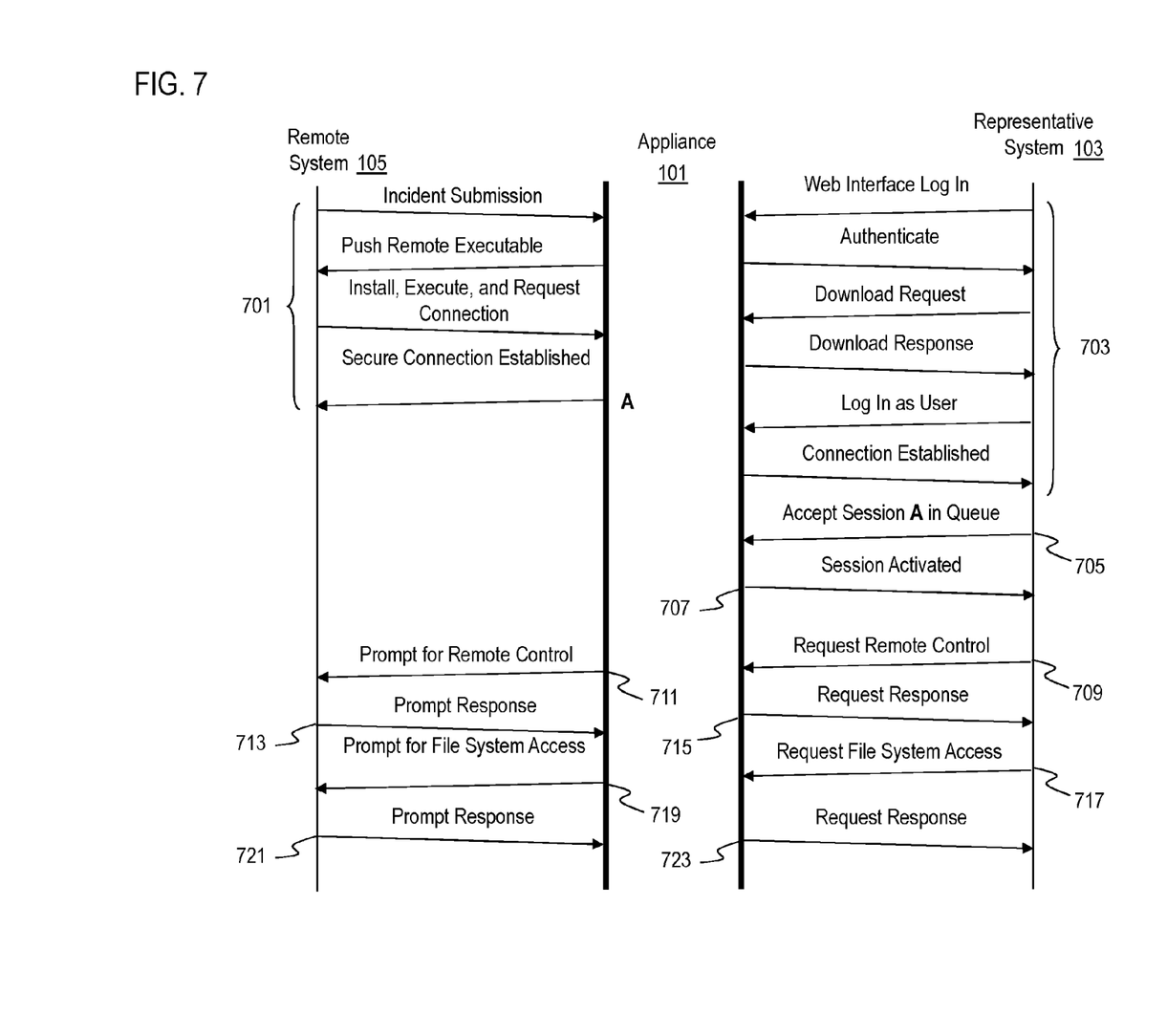
FIG. 7 is a ladder diagram of the interaction among the remote customer system, the support representative, and the network appliance for providing remote customer support, according to an exemplary embodiment.

FIG. 7 is a ladder diagram of the interaction among the remote customer system 105, the representative system 103, and the network appliance 101 for providing remote customer support, according to an exemplary embodiment. As shown, remote customer system 105 establishes a secure connection to the network appliance 101 by performing steps 701 similar to that of FIG. 4. The representative system 103 likewise establishes a secure connection with the network appliance 101, per step 703 (which resembles those steps 301-311 of FIG. 3).

At this junction, the network appliance 101 recognizes the support session that is requested by the remote customer system 105 as "Session A." It is contemplated that a single representative system 103 can serve one or more customer systems (only one of which is shown). In step 705, the representative system 103 accepts the Session A into its queue. When a representative accepts the session from the queue, the session becomes active. Assuming this session is selected for handling, the network appliance 101 activates the session, per step 707.

In step 707, the representative system 103 issues a request to the remote customer system 105 to control the remote customer system 105. This request is first received by the network appliance 101 and passed to the customer system 105, as in steps 709 and 711. In turn, the remote customer system 105 provides a response, which is forwarded to the network appliance 101 (step 713). The response is subsequently relayed, as in step 715, to the representative system 103; the response, in this example, indicates that the representative system 103 has permission to access the remote customer system 105.

At this time, the chat interfaces 259 and 281, for instance, are enabled. When the representative requests for remote control and file system access per step 717, the representative's request is checked against this user's permissions profile and forwarded to the remote customer system 105 (step 719). The appropriate prompts will be shown on the remote customer system 105 after the permissions have been verified. In steps 721, the remote customer system 105 generates the appropriate response for the network appliance 101, which then sends the response to the representative system 103.

The processes described herein for providing secure, on-demand remote support may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
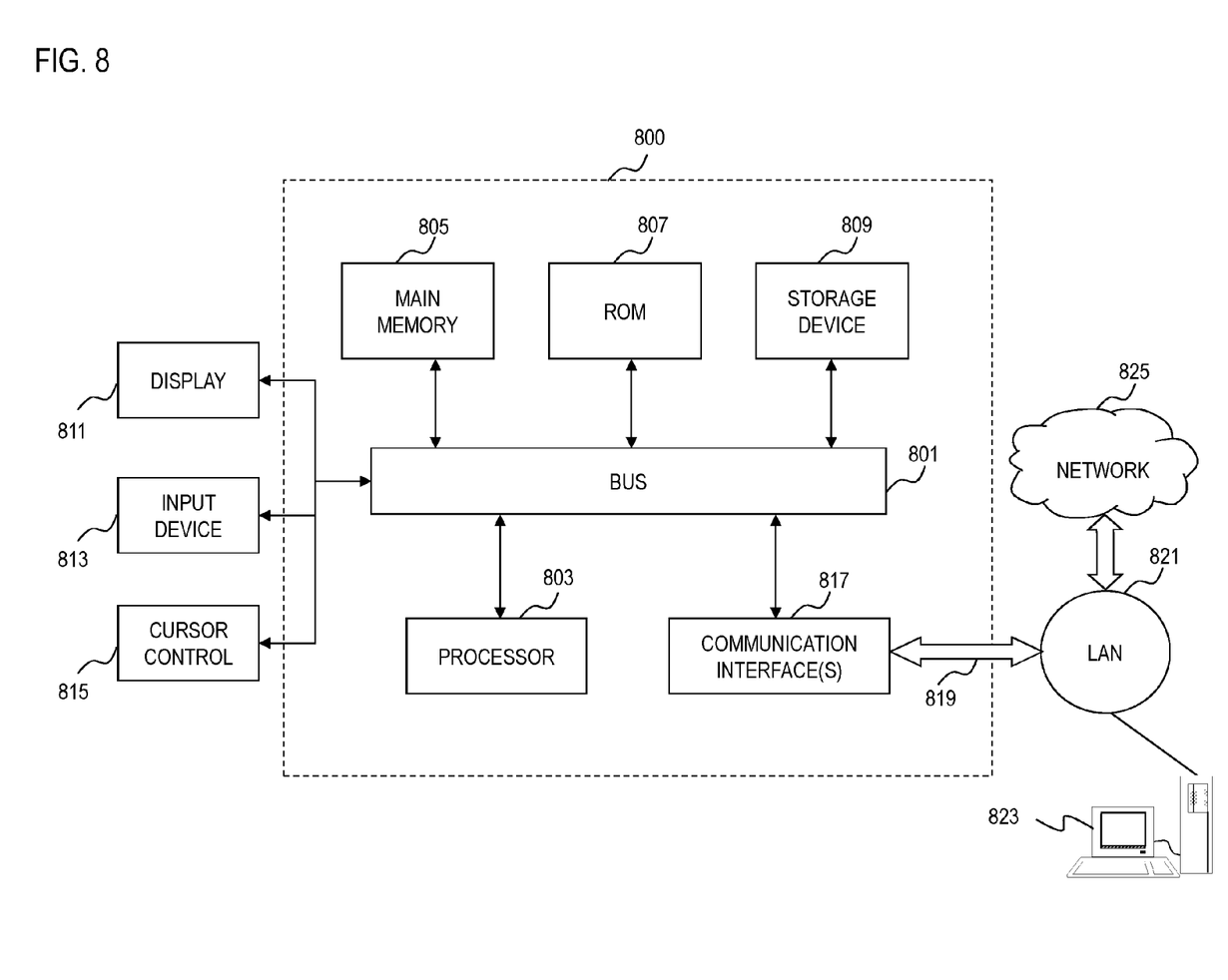
FIG. 8 is a diagram of a computer system that can be used to implement various embodiments of the invention.

FIG. 8 illustrates a computer system 800 upon which an embodiment according to various exemplary embodiments can be implemented. For example, the processes described herein can be implemented using the computer system 800. The computer system 800 includes a bus 801 or other communication mechanism for communicating information and a processor 803 coupled to the bus 801 for processing information. The computer system 800 also includes main memory 805, such as a random access memory (RAM) or other dynamic storage device, coupled to the bus 801 for storing information and instructions to be executed by the processor 803. Main memory 805 can also be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for controlling cursor movement on the display 811.

According to one embodiment contemplated herein, the processes described are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement the certain embodiments. Thus, the exemplary embodiments are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g. for Ethernet™ or an Asynchronous Transfer Model (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc. Although a single communication interface 817 is depicted in FIG. 8, multiple communication interfaces can also be employed.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communication network now commonly referred to as the "Internet") or to data equipment operated by a service provider. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an exemplary embodiment through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to non-volatile media, volatile media, and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out various exemplary embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While the invention has been described in connection with a number of embodiments and implementations, the invention is not so limited but covers various obvious modifications and equivalent arrangements, which fall within the purview of the appended claims.

What is claimed is:

1. A method comprising:
   presenting a graphical user interface of a network appliance, wherein the network appliance is configured to provide a remote access and control service between a first system and a second system,
   wherein at least one of the first system and the second system is authenticated by the remote access and control of the network appliance, respectively, based on authentication responses generated by the network appliance and sent to the first system and/or the second system, respectively, and then acknowledged by the first system and/or the second system, and
   wherein a user of the first system and a plurality of representatives of the second system are authenticated by the remote access and control service of the network appliance;
   establishing one or more encrypted communications sessions between the first system and the second system through the remote access and control service of the network appliance based on permission from the first system; and
   causing a support session to be created between the user and an initial representative among the plurality of representatives on the second system to support the user on the first system over the one or more encrypted communications sessions, wherein the initial representative selectively transfers the support session to another one of the plurality of representatives.

2. A method of claim 1, further comprising:
   presenting one or more other tabs in the graphical user interface to provide an update software function for uploading one or more new software packages to the network appliance.

3. A method of claim 2, wherein the update software function is configured to upgrade one or more software licenses on the network appliance.

4. A method of claim 2, wherein the one or more other tabs are further configured to provide a function of restricting access to the one or more tabs, the one or more other tabs, or a combination thereof by setting one or more network addresses of one or more parties allowed or not allowed access.

5. A method of claim 2, wherein the one or more other tabs are further configured to provide a function of restricting access to one or more tabs, the one or more other tabs, or a combination thereof by selecting one or more ports through which the graphical user interface is available.

6. A method of claim 2, further comprising:
   presenting one or more other tabs in the graphical user interface to provide a function of sending log messages to a system log server.

7. A method of claim 1, further comprising:
   presenting one or more other tabs in the graphical user interface to provide a function of requesting a certificate authority for a security certificate for the network appliance.

8. A method of claim 1, further comprising:
   presenting one or more other tabs in the graphical user interface to provide a function of configuring a communication server and designating one or more administrative contacts to enable the network appliance to send electronic notifications.

9. A method of claim 1, further comprising:
   presenting one or more other tabs in the graphical user interface to provide a function of debugging one or more network problems.

10. A method of claim 1, further comprising:
    presenting one or more other tabs in the graphical user interface to provide support contact information and to enable a network appliance-initiated support tunnel.

11. A method of claim 1, further comprising:
    presenting one or more other tabs in the graphical user interface to (a) provide a function of changing one or more access usernames, one or more access passwords, or a combination thereof; (b) provide an overview of one or more of the plurality of representative accounts, a list of one or more of the plurality of representatives who are logged in, a function for terminating a representative session, a messaging function to send a popup message to the one or more of the plurality of representatives; (c) a function of configuring one or more settings across the one or more of the plurality of representative accounts; or (d) a combination thereof.

12. A method of claim 1, further comprising:
presenting one or more other tabs in the graphical user interface to introduce one or more support sessions by (a) displaying a customer agreement, a customer greeting, or a combination thereof; (b) uninstalling a remote client from a customer's device following an end of a support session; or (c) a combination thereof.

13. A method of claim 1, further comprising:
presenting one or more other tabs in the graphical user interface to provide a function of pulling one or more of the plurality of representatives into a team.

14. A method of claim 1, further comprising:
presenting one or more other tabs in the graphical user interface to provide options for one or more of the plurality of representatives to support one or more attended devices, one or more unattended devices, or a combination thereof on a remote network with no pre-installed software client.

15. An apparatus configured as a network appliance, comprising a processor configured to:
present a graphical user interface for the network appliance, wherein the network appliance is configured to provide a remote access and control service between a first system and a second system,
wherein at least one of the first system and the second system is authenticated by the remote access and control of the network appliance, respectively, based on authentication responses generated by the network appliance and sent to the first system and/or the second system, respectively, and then acknowledged by the first system and/or the second system, and
wherein a user of the first system and a plurality of representatives of the second system are authenticated by the remote access and control service of the network appliance;
establish one or more encrypted communications sessions between the first system and the second system through the remote access and control service of the network appliance based on permission from the first system; and
cause a support session to be created between the user and an initial representative among the plurality of representatives on the second system to support the user on the first system over the one or more encrypted communications sessions, wherein the initial representative selectively transfers the support session to another one of the plurality of representatives.

16. An apparatus of claim 15, wherein the processor is further configured to:
present one or more other tabs in the graphical user interface to provide an update software function for uploading one or more new software packages to the network appliance.

17. An apparatus of claim 15, wherein the update software function is configured to upgrade one or more software licenses on the network appliance.

18. An apparatus of claim 15, wherein the one or more other tabs are further configured to provide a function of restricting access to the one or more tabs, the one or more other tabs, or a combination thereof by setting one or more network addresses of one or more parties allowed or not allowed access.

19. An apparatus of claim 15, wherein the one or more other tabs are further configured to provide a function of restricting access to one or more tabs, the one or more other tabs, or a combination thereof by selecting one or more ports through which the graphical user interface is available.

20. An apparatus of claim 15, wherein the processor is further configured to:
present one or more other tabs in the graphical user interface to provide a function of sending log messages to a system log server.

21. An apparatus of claim 15, wherein the processor is further configured to:
present one or more other tabs in the graphical user interface to provide a function of requesting a certificate authority for a security certificate for the network appliance.

22. An apparatus of claim 15, wherein the processor is further configured to:
present one or more other tabs in the graphical user interface to provide a function of configuring a communication server and designating one or more administrative contacts to enable the network appliance to send electronic notifications.

23. An apparatus of claim 15, wherein the processor is further configured to:
present one or more other tabs in the graphical user interface to provide a function of debugging one or more network problems.

24. A method of claim 1, wherein the network appliance connects the first system and the first system through at least one firewall.

25. A method of claim 1, wherein the graphical user interface is a web interface, the network appliance configured to host the web interface.

26. A method of claim 1, wherein the network appliance is a rack mountable device.

27. A method of claim 1, wherein the one or more encrypted communication sessions between the first system and the second system are established by:
receiving, by the remote access and control service of the network appliance, a request for permission to establish an encrypted static route from the second system;
transmitting the request to the first system;
receiving, by the remote access and control service of the network appliance, a response granting the request from the first system; and
transmitting the response to the second system.

28. A method of claim 1, further comprising:
receiving, by the remote access and control service of the network appliance, a request for access permission from the second system;
comparing the request by the second system to a permission profile associated with the user of the first system; and
generating the access permission for the second system.

29. A method of claim 28, wherein the access permission includes remote control and file system access.

30. An apparatus of claim 15, wherein the one or more encrypted communications sessions between the first system and the second system are established, and wherein the processor is further configured to:

receive, by the remote access and control service of the network appliance, a request for permission to establish an encrypted static route from the second system;

transmit the request to the first system;

receive, by the remote access and control service of the network appliance, a response granting the request from the first system; and transmit the response to the second system.

31. An apparatus of claim 15, wherein the processor is further configured to:

receive, by the remote access and control service of the network appliance, a request for an access permission from the second system;

compare the request by the system to a permission profile associated with the user of the first system; and generate the access permission for the second system.

32. An apparatus of claim 31, wherein the access permission includes remote control and file system access.

* * * * *

UNITED STATES PATENT AND TRADEMARK OFFICE
CERTIFICATE OF CORRECTION

PATENT NO. : 9,780,966 B2
APPLICATION NO. : 13/860259
DATED : October 3, 2017
INVENTOR(S) : Joel Bomgaars et al.

Page 1 of 1

It is certified that error appears in the above-identified patent and that said Letters Patent is hereby corrected as shown below:

On the Title Page

Please insert the following Related U.S. Application Data:
--Continuation of 11/764,691, filed June 18, 2007, now patent No. 8,589,489, which is a continuation of 11/748,871, filed May 15, 2007, now patent No. 9,621,559, which claims benefit of U.S. Provisional Application No. 60/814,867, filed June 19, 2006.--

Signed and Sealed this
Eighteenth Day of December, 2018

Andrei Iancu
*Director of the United States Patent and Trademark Office*